(No Model.)
L. J. EWELL.
VEHICLE RUNNING GEAR.
No. 499,288. Patented June 13, 1893.
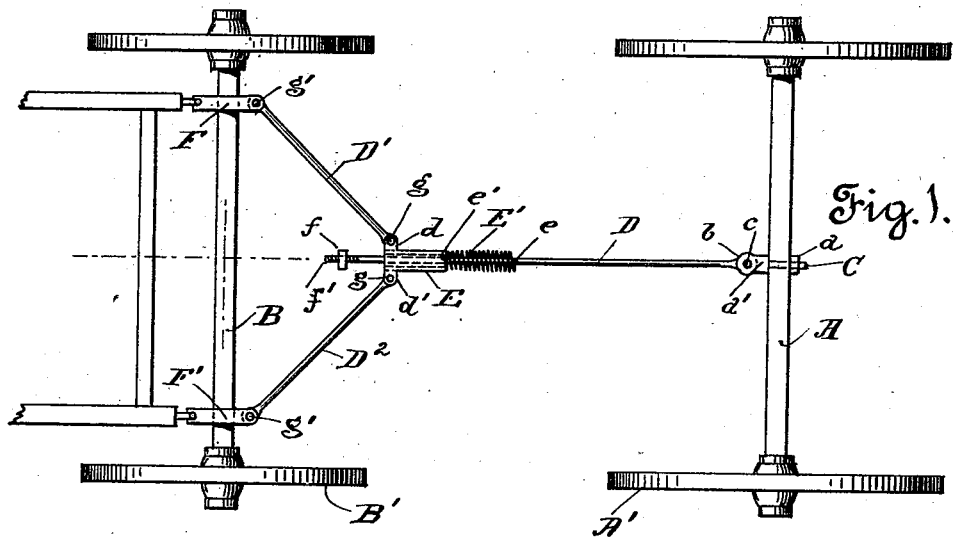
Fig. 1.
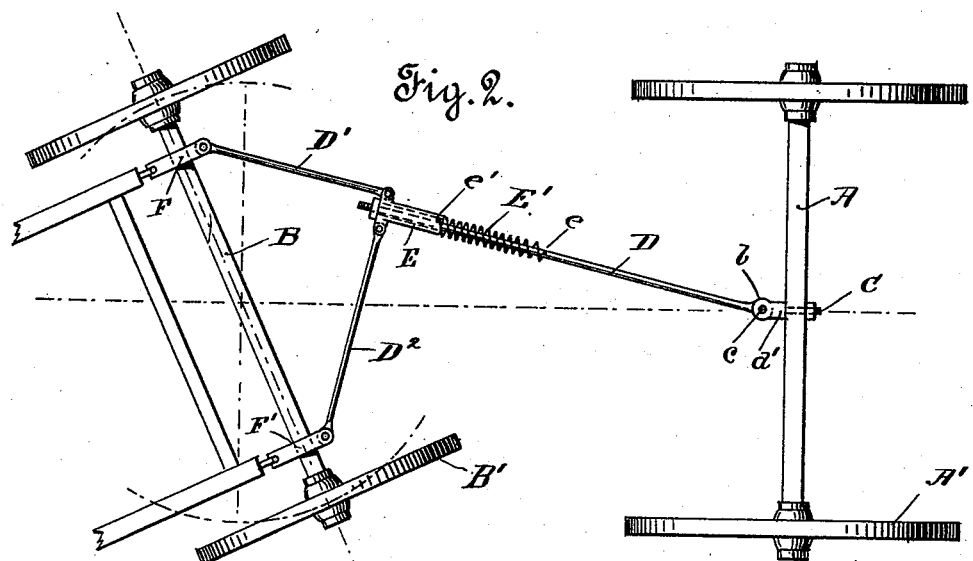
Fig. 2.
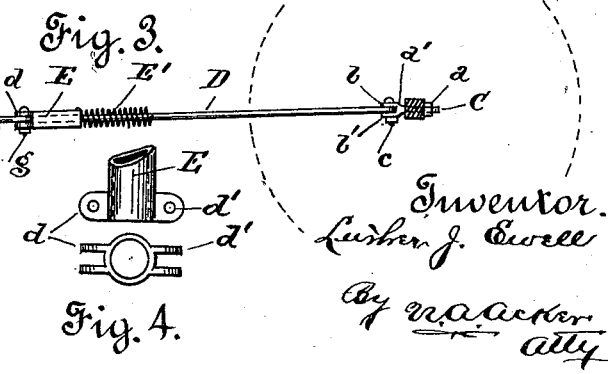
Fig. 3.
Fig. 4.
Witnesses.
F. Monteverde
M. G. Loefler
Inventor.
Luther J. Ewell
By N. A. Acker
Atty

UNITED STATES PATENT OFFICE.

LUTHER J. EWELL, OF SAN FRANCISCO, CALIFORNIA.

VEHICLE RUNNING-GEAR.

SPECIFICATION forming part of Letters Patent No. 499,288, dated June 13, 1893.

Application filed January 23, 1893. Serial No. 459,322. (No model.)

*To all whom it may concern:*

Be it known that I, LUTHER J. EWELL, a citizen of the United States, residing at San Francisco, in the county of San Francisco and State of California, have invented certain new and useful Anti-Cramp Devices for Vehicles; and I do hereby declare the following to be a full, clear, and exact description of said invention, such as will enable others skilled in the art to which it most nearly appertains to make, use, and practice the same.

This invention relates to what I term an "anti-cramp device" for attachment to wagons, buggies, &c., which consists in the arrangement of parts and details of construction as will be hereinafter more fully set forth in the drawings, described and pointed out in the specification.

The object of my invention is to provide a device which shall effectually obviate the cramping of the wheel with the vehicle body when making a sudden turn of the wagon or buggy in order to prevent not only the upsetting of the vehicle, but also prevent breakage of the wheel, which does follow in case the wheel is permitted to cramp beneath the vehicle body.

Referring to the drawing forming a part of this application, wherein similar letters of reference denote corresponding parts throughout the entire specification and several views—

Figure 1, is a top plan view of a vehicle, with the body removed, showing my attachment secured thereto; Fig. 2, a similar view showing position of my attachment when the vehicle is making a turn. Fig. 3, is a vertical longitudinal sectional view taken on line $x$—$x$— Fig. 1; and Fig. 4, enlarged detail views of the reach sleeve.

The letter A, indicates the rear axle and B, the forward axle of an ordinary vehicle, which axles have secured thereon, in the usual manner, wheels A' and B'.

Through the center of the rear axle A, passes the bolt C which is held in place by means of nut $a$. The inner end or head $a'$ of this bolt is provided with projecting ears $b$, $b'$, see Fig. 3, and between these ears is secured rear end of the reach or coupling pole D, by means of a key or king bolt $c$. However, if so desired, this reach or coupling pole may be connected to the rear axle by means of a suitable clevis. The forward end of said pole is connected to the front axle B, through the medium of the arms D', D², as hereinafter described.

Upon the forward end of the reach pole is loosely fitted the sleeve E, which sleeve is provided with the laterally projecting ears $d$, $d'$. This sleeve is pressed continually outward by the pressure of the spring E', which surrounds the reach pole and is secured thereto, at the point $e$, the opposite end being attached to said sleeve, as shown at $e'$. The sleeve is kept from moving off the reach pole by means of the nut $f$, which fits upon the screw-threaded end $f'$, of said pole, as shown.

The rear or inner end of arm D' and D², I movably secure between ears $d$, $d'$, of sleeve E, by means of bolt or pins $g$, while the opposite end of each arm is connected to the clip or clevis F, F', by means of bolts or pins $g'$. It will thus be noticed that the arms D', D², stand at an angle of about forty-five degrees to the reach pole.

When the vehicle is moving in a direct line, the several parts of my attachment stand in relation to each other as set forth in Fig. 1.

As the forward axle is thrown around, in order to permit of a turn being made, the arms gradually change their position until one of the same, say arm D', lies in a parallel plane to the reach bar, while the other is thrown at a right angle thereto, as shown at Fig. 2. When the arms have assumed this position the wheels of the vehicle have turned the full distance and this radial throw should be so regulated as to allow of the wheel just missing contact with the vehicle body. As the arms change to the position shown in Fig. 2, the sleeve E, is drawn forward until same contacts with nut $f$, which prevents the further movement thereof and thus checks the travel of the arms and in this manner locks the axle, consequently preventing the wheels from cramping. The spring E', is expanded during the forward travel of the sleeve E, consequently when the front axle moves back into position, at right angles to the reach pole, the resiliency of this spring assists to draw the sleeve back to the position shown in Fig. 1.

Of course the length of the reach or coupling pole will depend upon the distance the axles are placed apart, inasmuch as the reach varies in different vehicles, but the relative length of the arms D', D², remain the same, which is about ten inches greater than the length of the axle from its center to its outer portion.

By the use of my device a positive stop is given to the turn of the front axle after a certain radius has been described, and the circular travel is so regulated that it is impossible for the inner wheel to force itself against the vehicle body, and cramp therewith, thus absolutely preventing the upsetting of the vehicle.

My invention is designed for use in connection with that class of vehicles wherein the wheel does not pass entirely under the body when making a turn, as is the case with buggies and all light running vehicles and is not a substitute for the ordinary running gear but is an attachment or supplement thereto.

By raising or lowering the nut $f$, a greater or less throw will be imparted to the front axle, thus allowing of a short or long turn to be made by the vehicle.

Having thus described my invention, what I claim as new, and desire to secure protection in by Letters Patent of the United States, is—

1. The combination with the front and rear axles, of the reach having one end pivotally connected with the rear axle at the center of the same, and the divergent arms having their front ends pivotally connected with the front axle and their rear ends movably mounted on the reach.

2. The combination with the axles, of the reach having its rear end pivotally connected to the rear axle at the center of the same, the sleeve movably mounted on the front end of the reach, and the divergent arms having their front ends pivotally connected to the front axle and their rear ends pivoted to the said sleeve.

3. The combination with the axles, of the reach pivoted to the rear axle at the center of the same, the sleeve mounted on the reach, a stop on the front end of the reach to limit the forward movement of the sleeve, a spring secured to the sleeve and the reach to retract the sleeve, and divergent arms having their front ends pivoted to the front axle and their rear ends pivoted to the sleeve.

In testimony whereof I affix my signature in presence of two witnesses.

LUTHER J. EWELL.

Witnesses:
N. A. ACKER,
M. G. LOEFLER.